(12) United States Patent
Schetzel et al.

(10) Patent No.: US 10,767,502 B2
(45) Date of Patent: Sep. 8, 2020

(54) COMPOSITE TURBINE VANE WITH THREE-DIMENSIONAL FIBER REINFORCEMENTS

(71) Applicants: Rolls-Royce Corporation, Indianapolis, IN (US); Rolls-Royce North American Technologies, Inc., Indianapolis, IN (US)

(72) Inventors: Tara G. Schetzel, Indianapolis, IN (US); Ted J. Freeman, Danville, IN (US); Jun Shi, Carmel, IN (US); Jeffrey A. Walston, Indianapolis, IN (US); Steven Clarke, Mansfield, MA (US); Sean Kroszner, Warwick, RI (US)

(73) Assignees: Rolls-Royce Corporation, Indianapolis, IN (US); Rolls-Royce North American Technologies Inc., Indianapolis, IN (US); Rolls-Royce High Temperature Composites Inc., Cypress, CA (US)

(*) Notice: Subject to any disclaimer, the term of this patent is extended or adjusted under 35 U.S.C. 154(b) by 180 days.

(21) Appl. No.: 15/462,230

(22) Filed: Mar. 17, 2017

(65) Prior Publication Data

US 2018/0179906 A1 Jun. 28, 2018

Related U.S. Application Data

(60) Provisional application No. 62/438,533, filed on Dec. 23, 2016.

(51) Int. Cl.
*F01D 9/04* (2006.01)
*F01D 5/28* (2006.01)
(Continued)

(52) U.S. Cl.
CPC ............. *F01D 9/041* (2013.01); *F01D 5/282* (2013.01); *F01D 5/284* (2013.01); *F01D 25/005* (2013.01);
(Continued)

(58) Field of Classification Search
CPC ........ F01D 9/065; F01D 25/005; F01D 5/284; F01D 5/282; F01D 5/186; F01D 5/00;
(Continued)

(56) References Cited

U.S. PATENT DOCUMENTS 2,772,856 A  12/1956 Nelson et al.
3,053,505 A   9/1962 Welsh
(Continued)

FOREIGN PATENT DOCUMENTS

EP     2500548 A1    9/2012
EP     3064715 A1    9/2016
WO  2012156626 A1   11/2012

OTHER PUBLICATIONS

Extended EP Search Report completed on May 9, 2018 and issued in connection with European Patent Application No. 17206375.2.

*Primary Examiner* — Richard A Edgar
*Assistant Examiner* — Maranatha Boardman
(74) *Attorney, Agent, or Firm* — Barnes & Thornburg LLP

(57) ABSTRACT

A turbine vane made from ceramic matrix composite material and adapted for use in a gas turbine engine. The turbine vane is made from ceramic matrix composite materials with three-dimensionally woven or braided reinforcing tows and includes an inner band, an outer band, and an airfoil that extends between the inner band and the outer band.

20 Claims, 4 Drawing Sheets

(51) Int. Cl.
  *F01D 25/00* (2006.01)
  *F01D 5/18* (2006.01)
(52) U.S. Cl.
  CPC .............. *F01D 5/18* (2013.01); *F01D 5/188* (2013.01); *F05D 2240/80* (2013.01); *F05D 2300/6033* (2013.01); *F05D 2300/6034* (2013.01)
(58) Field of Classification Search
  CPC . F01D 5/18; F01D 5/181; F01D 5/187; F01D 5/20; F05D 2260/202; F05D 2260/20; F05D 2260/221; F05D 2300/6033; F05D 2300/6034; F05D 2240/80; F05D 2240/122; F05D 2300/614; Y02T 50/676; Y02T 50/672; D03D 25/00; D03D 25/005; Y10T 442/3195; Y10T 442/3203; Y10T 442/3211; Y10T 442/3301
  USPC ......................................... 415/115; 416/97 R
  See application file for complete search history.

(56) References Cited

U.S. PATENT DOCUMENTS

| | | | | |
|---|---|---|---|---|
| 3,215,511 A * | | 11/1965 | Chisholm | F01D 5/284 29/889.21 |
| 3,501,247 A | | 3/1970 | Tournere | |
| 4,026,659 A * | | 5/1977 | Freeman, Jr. | F01D 5/186 415/115 |
| 4,434,835 A | | 3/1984 | Willgoose | |
| 5,272,869 A | | 12/1993 | Dawson et al. | |
| 5,399,069 A | | 3/1995 | Marey et al. | |
| 5,765,993 A | | 6/1998 | Weiss | |
| 6,200,092 B1 * | | 3/2001 | Koschier | F01D 5/146 415/191 |
| 6,398,501 B1 * | | 6/2002 | Darkins, Jr. | F01D 5/147 416/226 |
| 6,409,472 B1 | | 6/2002 | McMahon et al. | |
| 6,478,535 B1 | | 11/2002 | Chung | |
| 6,595,747 B2 | | 7/2003 | Bos | |
| 6,709,230 B2 | | 3/2004 | Morrison et al. | |
| 7,066,717 B2 | | 6/2006 | Morrison et al. | |
| 7,093,359 B2 | | 8/2006 | Morrison et al. | |
| 7,153,096 B2 | | 12/2006 | Thompson et al. | |
| 7,255,535 B2 | | 8/2007 | Albrecht et al. | |
| 7,316,539 B2 | | 1/2008 | Campbell | |
| 7,393,182 B2 | | 7/2008 | Matheny | |
| 7,393,183 B2 * | | 7/2008 | Keller | F01D 5/147 416/223 A |
| 7,435,058 B2 | | 10/2008 | Campbell et al. | |
| 7,452,189 B2 | | 11/2008 | Shi et al. | |
| 7,488,157 B2 | | 2/2009 | Marini et al. | |
| 7,510,379 B2 | | 3/2009 | Marusko et al. | |
| 7,549,840 B2 | | 6/2009 | Subramanian et al. | |
| 7,799,405 B1 | | 9/2010 | Vance et al. | |
| 7,837,438 B2 | | 11/2010 | Campbell | |
| 7,895,745 B2 * | | 3/2011 | Althoff | F03D 1/0675 29/463 |
| 8,206,098 B2 * | | 6/2012 | Prill | F01D 5/284 415/200 |
| 8,357,323 B2 * | | 1/2013 | Morrison | B28B 1/002 264/258 |
| 9,683,443 B2 | | 6/2017 | Freeman et al. | |
| 10,107,119 B2 * | | 10/2018 | Walston | F01D 9/041 |
| 10,145,039 B2 * | | 12/2018 | Marchal | B29C 70/24 |
| 2003/0059577 A1 | | 3/2003 | Morrison et al. | |
| 2003/0223861 A1 | | 12/2003 | Morrison et al. | |
| 2004/0062639 A1 | | 4/2004 | Glynn et al. | |
| 2005/0238491 A1 | | 10/2005 | Morrison et al. | |
| 2005/0254942 A1 | | 11/2005 | Morrison et al. | |
| 2006/0226290 A1 | | 10/2006 | Campbell | |
| 2006/0285973 A1 | | 12/2006 | Keller | |
| 2007/0140835 A1 | | 6/2007 | Albrecht et al. | |
| 2007/0172355 A1 | | 7/2007 | Cunha et al. | |
| 2008/0017280 A1 | | 1/2008 | Vargas et al. | |
| 2008/0131285 A1 | | 6/2008 | Albert et al. | |
| 2008/0203236 A1 | | 8/2008 | Mazzola et al. | |
| 2009/0003988 A1 | | 1/2009 | Campbell | |
| 2011/0293828 A1 | | 12/2011 | Eberling-Fux et al. | |
| 2012/0279631 A1 | | 11/2012 | Mizokami et al. | |
| 2012/0301306 A1 | | 11/2012 | Alvanos et al. | |
| 2012/0301314 A1 | | 11/2012 | Alvanos et al. | |
| 2013/0028741 A1 | | 1/2013 | Kleinow et al. | |
| 2014/0161626 A1 | | 6/2014 | Podgorski et al. | |
| 2014/0205463 A1 | | 7/2014 | Herraiz et al. | |
| 2015/0003989 A1 | | 1/2015 | Uskert et al. | |
| 2015/0040396 A1 | | 2/2015 | Fremont et al. | |
| 2016/0177743 A1 * | | 6/2016 | Thomas | F01D 5/284 416/230 |
| 2016/0258320 A1 * | | 9/2016 | Thomas | F01D 9/065 |
| 2016/0312626 A1 * | | 10/2016 | Schetzel | C04B 35/111 |

* cited by examiner

COMPOSITE TURBINE VANE WITH THREE-DIMENSIONAL FIBER REINFORCEMENTS

CROSS REFERENCE TO RELATED APPLICATIONS

This application claims priority to and the benefit of U.S. Provisional Patent Application No. 62/438,533, filed 23 Dec. 2016, the disclosure of which is now expressly incorporated herein by reference.

FIELD OF THE DISCLOSURE

The present disclosure relates generally to components for gas turbine engines, and more specifically to composite turbine vanes used in high-temperature sections of gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Turbines typically include alternating stages of static vane assemblies and rotating wheel assemblies. These vane and wheel assemblies are typically exposed to high temperatures during operation of the engine. Accordingly, the incorporation of materials that can withstand high temperatures into these components is an area of interest. Composite materials that can withstand high temperatures are of particular interest as a replacement for current metallic vane assemblies and metallic wheel assemblies.

SUMMARY

The present disclosure may comprise one or more of the following features and combinations thereof.

According to the present disclosure, a turbine vane made from ceramic matrix composite material and adapted for use in a gas turbine engine is described. The turbine vane may include an in inner band configured to define a circumferentially extending inner flow path surface, an outer band configured to define a circumferentially extending outer flow path surface, and an airfoil that extends from the inner band to the outer band across a flow path defined between the inner flow path surface and the outer flow path surface.

In illustrative embodiments, the turbine vane may include three-dimensionally woven reinforcement fibers suspended in matrix material. The three-dimensionally woven reinforcement fibers may include a plurality of tows each shaped to provide at least a portion of the inner band, the outer band, and the airfoil.

In illustrative embodiments, the airfoil may include a primary airfoil portion made at least in part from the three-dimensionally woven reinforcement fibers. The three-dimensionally woven fiber reinforcements of the primary airfoil portion may be shaped to provide a pressure side wall and a suction side wall spaced apart from the pressure side wall to define a cooling cavity therebetween.

In illustrative embodiments, the three-dimensionally woven fiber reinforcements of the primary airfoil portion may be shaped to provide a rib that extends from the pressure side wall to the suction side wall through the cooling cavity. The rib may be interrupted between the radially inner band and the radially outer band such that spaces are formed between portions of the rib.

In illustrative embodiments, the airfoil may include a trailing-edge insert coupled to the primary airfoil portion to define a trailing edge of the airfoil. The trailing-edge insert may be formed to include cooling air discharge apertures in fluid communication with the cooling cavity to carry cooling air from inside the airfoil out to the gas path. The trailing-edge insert may extend into recesses formed in the inner band and the outer band to couple the trailing-edge insert to the primary airfoil portion. The trailing-edge insert may comprise one of monolithic ceramic material and ceramic matrix composite material; and the trailing-edge insert is coupled to the primary airfoil portion by matrix material.

In illustrative embodiments, the three-dimensionally woven reinforcement fibers may be biased toward hoop-direction fibers in the airfoil portion of the vane. Accordingly, the number of reinforcement fibers that extend in the hoop direction from a pressure side to a suction side of the airfoil exceed the number of radial-direction fibers that extend outward in a radial direction from the inner band to the outer band.

In illustrative embodiments, the turbine vane may include an airfoil conversion layer. The airfoil conversion layer may provide an exterior surface of the airfoil having a surface finish smoother than an interior surface of the airfoil. In illustrative embodiments, the airfoil conversion layer may include one of a layer of matrix material and an overwrap of reinforced composite material.

In illustrative embodiments, the airfoil includes a trailing-edge insert coupled to the primary airfoil portion to define a trailing edge of the airfoil. The airfoil conversion layer may include an overwrap of reinforced composite material. The overwrap of reinforced composite material may extend over both the three-dimensionally woven reinforcement fibers and the trailing-edge insert to couple the trailing-edge insert to the three-dimensionally woven reinforcement fibers.

In illustrative embodiments, the turbine vane may include an inner band conversion layer and an outer band conversion layer. The inner band conversion layer may provide the inner flow path surface. The outer band conversion layer may provide the outer flow path surface. The inner band conversion layer may have a surface finish smoother than an outer surface of the inner band. The outer band conversion layer may have a surface finish smoother than an inner surface of the outer band.

According to another aspect of the present disclosure, a turbine vane made from ceramic matrix composite material and adapted for use in a gas turbine engine is taught. The turbine vane may include an inner band configured to define a circumferentially extending inner flow path surface, an outer band configured to define a circumferentially extending outer flow path surface, and an airfoil that extends from the inner band to the outer band across a flow path defined between the inner flow path surface and the outer flow path surface. The inner band may include three-dimensionally woven reinforcement fibers. The outer band may include three-dimensionally woven reinforcement fibers. The airfoil may include three-dimensionally woven reinforcement fibers In illustrative embodiments, the airfoil may include a trailing-edge insert coupled to a primary airfoil portion that includes the three-dimensionally woven reinforcement such that the trailing-edge insert defines a trailing edge of the airfoil. The trailing-edge insert may be formed to include cooling air discharge apertures in fluid communication with a cooling cavity formed by the primary airfoil portion to carry cooling air from inside the airfoil out to the gas path.

In illustrative embodiments, the trailing-edge insert may extend into recesses formed in the inner band and the outer band to couple the trailing-edge insert to the primary airfoil portion. The trailing-edge insert may comprise one of monolithic ceramic material and ceramic matrix composite material. The trailing-edge insert may be coupled to the primary airfoil portion by matrix material.

In illustrative embodiments, the three-dimensionally woven reinforcement fibers included in the airfoil may include a plurality of tows each shaped to provide at least a portion of the inner band and the outer band. The three-dimensionally woven reinforcement fibers included in the airfoil may be biased toward hoop-direction fibers such that the number of reinforcement fibers that extend from a pressure side to a suction side of the airfoil around a leading edge of the airfoil exceed the number of radial-direction fibers that extend outward in a radial direction from the inner band to the outer band.

These and other features of the present disclosure will become more apparent from the following description of the illustrative embodiments.

DETAILED DESCRIPTION

Figure 1:
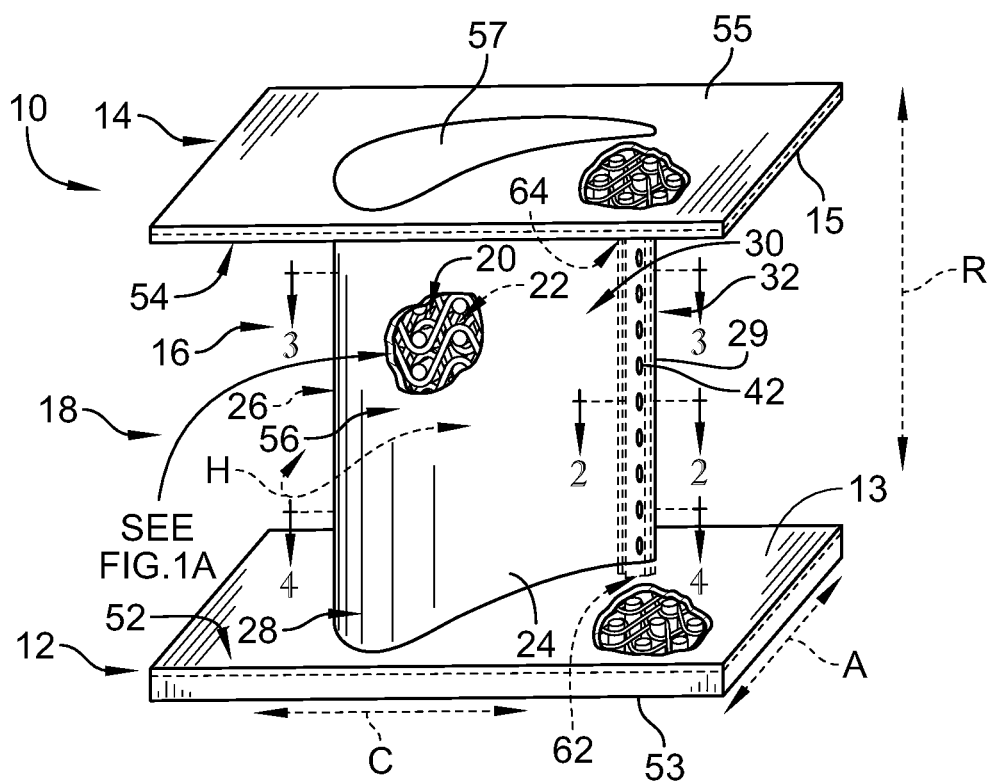
FIG. 1 is a perspective view of a composite turbine vane including an airfoil, an inner band, and an outer band with portions cut away to show integrated three-dimensionally woven fiber reinforcements that are included in the airfoil, the inner band, and the outer band of the composite turbine vane.

For the purposes of promoting an understanding of the principles of the disclosure, reference will now be made to a number of illustrative embodiments illustrated in the drawings and specific language will be used to describe the same.

A turbine vane 10 according to the present disclosure is adapted to redirect hot, high-temperature gasses as they move through the turbine section of a gas turbine engine as suggested in FIG. 1. The turbine vane 10 illustratively is of ceramic matrix composite material construction such that the turbine vane 10 is suitable for use in high temperature areas within the turbine section. More particularly, in the illustrated embodiment, the turbine vane 10 is manufactured from three-dimensional ceramic matrix composite having three-dimensionally woven or braided fiber reinforcements that make up at least a portion of each part of the turbine vane 10. Accordingly, the structure of the turbine vane 10 may be strengthened relative to more simply laid up or otherwise manufactured turbine vanes including ceramic matrix composites.

The turbine vane 10 includes an inner band 12, an outer band 14, and an airfoil 16 as shown in FIG. 1. The inner band 12 defines a circumferentially extending inner flow path surface 13 and the outer band 14 defines a circumferentially extending outer flow path surface 15 such that a flow path 18 is located between the inner band 12 and the outer band 14. The airfoil 16 extends from the inner band 12 to the outer band 14 across the flow path between the inner flow path surface 13 and the outer flow path surface 15.

In the illustrative embodiment, the turbine vane 10 includes three-dimensional reinforcing fibers 20 suspended in matrix material 22 as suggested in FIG. 1. The three-dimensional reinforcing fibers 20 (sometimes called a preform) are illustratively woven together and are shaped to provide at least a portion of the inner band 12, the outer band 14, and the airfoil 16. More specifically, individual tows of the three-dimensional reinforcing fibers 20 form part of the inner band 12, the outer band 14, and the airfoil 16. Accordingly, the joints between the bands 12, 14 and the airfoil are integrally reinforced.

Figure 1A:
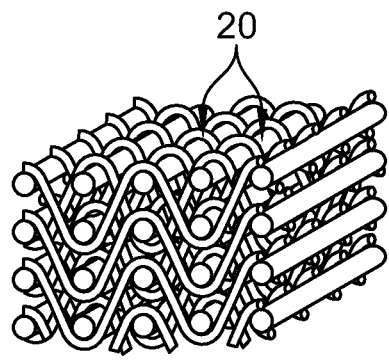
FIG. 1A is a detail view of illustrative three-dimensionally woven fiber reinforcements included in the composite turbine vane of FIG. 1 showing the interwoven arrangement of fibers in various directions.

The three-dimensional reinforcing fibers 20 are illustratively silicon-carbide (Si—C) fibers but in other embodiments may be other materials suitable for ceramic matrix composite construction. The three-dimensional reinforcing fibers 20 are also biased such that the weave is biased in a hoop direction H. In view of the biasing of fibers 20, more fibers extend in the hoop direction H from a pressure side 24 to a suction side 26 of the airfoil 16 around a leading edge 28 of the airfoil 16 than fibers in any one of a radial direction R, axial direction A, or circumferential direction C as suggested in FIG. 1 and FIG. 1A.

The matrix material 22 is a ceramic-material-containing matrix material; illustratively silicon-carbide (Si—C) matrix material. In other embodiments, other matrix material suitable for ceramic matrix composite material construction may be used.

The airfoil 16 illustratively includes a primary airfoil portion 30 and a trailing-edge insert 32 as shown in FIG. 1. The primary airfoil portion 30 is made at least in part from the three-dimensionally woven reinforcement fibers 20. The trailing-edge insert 32 is coupled to the primary airfoil portion 30 and defines a trailing edge 29 of the airfoil 16.

Figure 3:
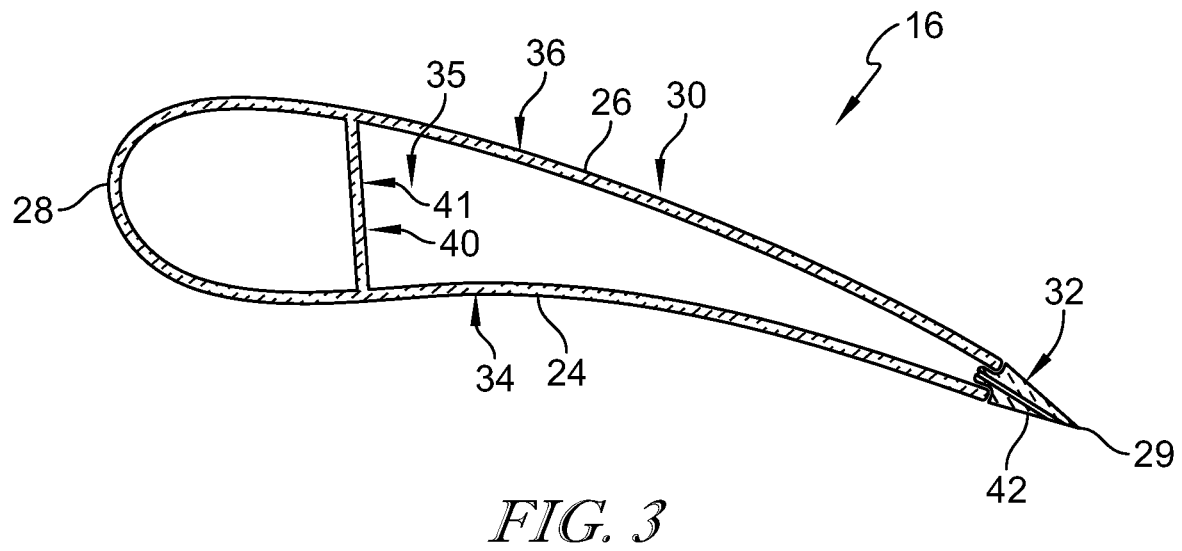
FIG. 3 is a cross-sectional view of the airfoil included in the composite turbine vane of FIG. 1 taken at line 3-3 showing that the three-dimensionally woven fiber reinforcements are shaped to provide a pressure-side wall, a suction-side wall, and a rib (or riblet) that extends from the pressure-side wall to the suction-side wall across a cooling-air cavity therebetween.
Figure 4:
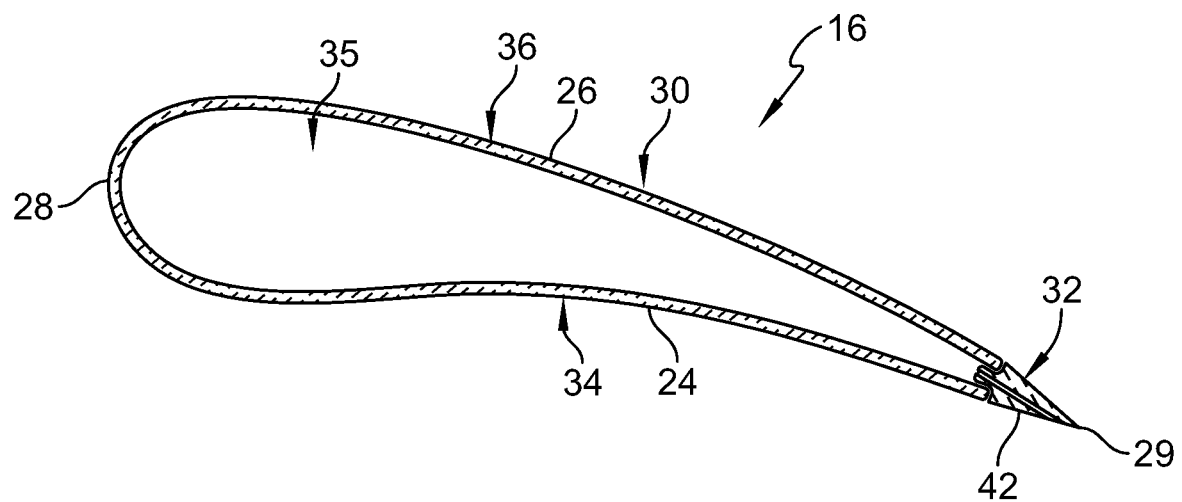
FIG. 4 is a cross-sectional view of the airfoil included in the composite turbine vane of FIG. 1 taken at line 4-4 showing that the rib (or riblet) of FIG. 3 is interrupted in the radial direction and does not extend radially all the way along the airfoil.

The three-dimensionally woven fiber reinforcements 20 of the primary airfoil portion 30 are shaped to provide a pressure side wall 34 and a suction side wall 36 spaced apart from the pressure side wall 34 to define a cooling cavity 35 therebetween as shown in the cross sectional views of FIGS. 3 and 4. In the illustrative embodiment, the three-dimensionally woven fiber reinforcements 20 of the primary airfoil portion 30 are shaped to provide a rib 40 that extends from the pressure side wall 34 to the suction side wall 36 through the cooling cavity 35. The rib 40 may be optionally interrupted into riblets 41 between the radially inner band 12 and the radially outer band 14 such that6 spaces are formed between portions of the riblets 41 as suggested by FIGS. 3 and 4.

Figure 2:
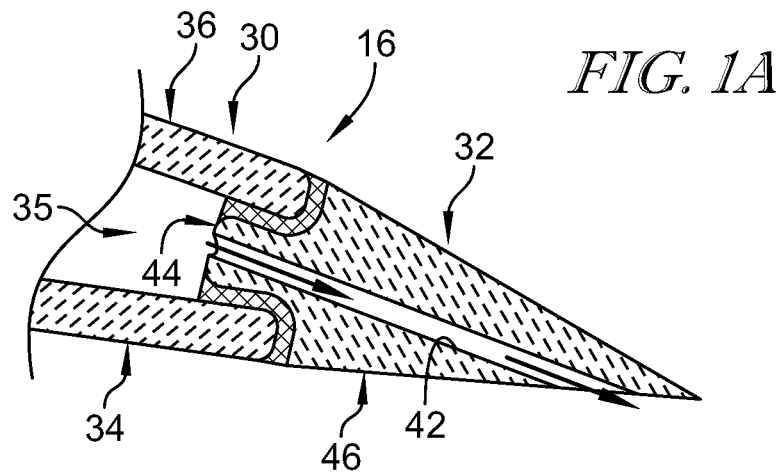
FIG. 2 is a cross-sectional view of a portion of the airfoil included in the composite turbine vane included in FIG. 1 taken at line 2-2 showing that a trailing-edge insert is bonded to a primary airfoil portion having three-dimensionally woven fibers and showing that the trailing-edge insert forms the trailing edge of the airfoil.

The trailing-edge insert 32 of the airfoil 16 is formed to include cooling air discharge apertures 42 in fluid communication with the cooling cavity 35 of the primary airfoil portion 30 to carry cooling air from inside the airfoil 16 out to the flow path 18 as shown in FIG. 2. The trailing-edge insert 32 extends into recesses 62, 64 formed in the inner band 12 and the outer band 14 to couple the trailing-edge insert 32 to the primary airfoil portion 30 as shown in FIG. 1. The trailing edge insert 32 includes an interior portion 44 that extends into cooling cavity 35 and exterior portion 46 arranged outside cooling cavity 35. Interior portion 44 provides bonding surfaces that face inner surfaces of primary airfoil portion 30 where matrix or other bonds can be formed.

In illustrative embodiments, the trailing-edge insert 32 comprises one of monolithic ceramic material and ceramic matrix composite material such that the insert may be coupled to the primary airfoil portion 30 by matrix material. In other embodiments, the trailing-edge insert 32 may be metallic or made from other materials.

In the illustrative embodiment, optional conversion layers 52, 54, 56 are also included in the turbine vane 10 as shown in FIG. 1. Conversion layers 52, 54, 56 provide relatively smooth surfaces for interface with gasses moving through flow path 18 in applications where the texture of the three-dimensional composite is rougher than desired. Conversion layers 52, 54, 56 may be provided by one or more of a layer of matrix material or an overwrap of reinforced composite material, such as a tape or a felt cloth. Conversion layers 52, 54, 56 of the present disclosure comprise silicon-carbide (Si—C) material but may be made up of other materials suitable for ceramic matrix composite construction.

An inner band conversion layer 52 provides the inner flow path surface 13 and an outer band conversion layer 54 provides the outer flow path surface 15 as shown in FIG. 1. The inner band conversion layer 52 has a surface finish smoother than an outer surface 53 of the inner band 12. The outer band conversion layer 54 has a surface finish smoother than an inner surface 55 of the outer band 14.

An airfoil conversion layer 56 provides an exterior surface of the airfoil 16 having a surface finish smoother than an interior surface 57 of the airfoil 16 as shown in FIG. 1. Airfoil conversion layer 56 may be wrapped over the interface of primary airfoil portion 30 and trailing-edge insert 32 and over a portion of the exterior portion 46 of trailing-edge insert 32 in order to couple trailing-edge insert 32 to primary airfoil portion 30.

In some embodiments, inner band 12, outer band 14, and primary airfoil portion 30 of airfoil 16 are co-infiltrated (co-processed) with matrix material to form an integral component. In addition, trailing-edge member 32 of the airfoil and/or the conversion layers 52, 54, 56 may also be co-infiltrated with matrix material to create an integral component. Processes such as chemical vapor infiltration (CVI) and the like may be used to infiltrate matrix material into the reinforcing fibers of the turbine vane 10.

Figure 5:
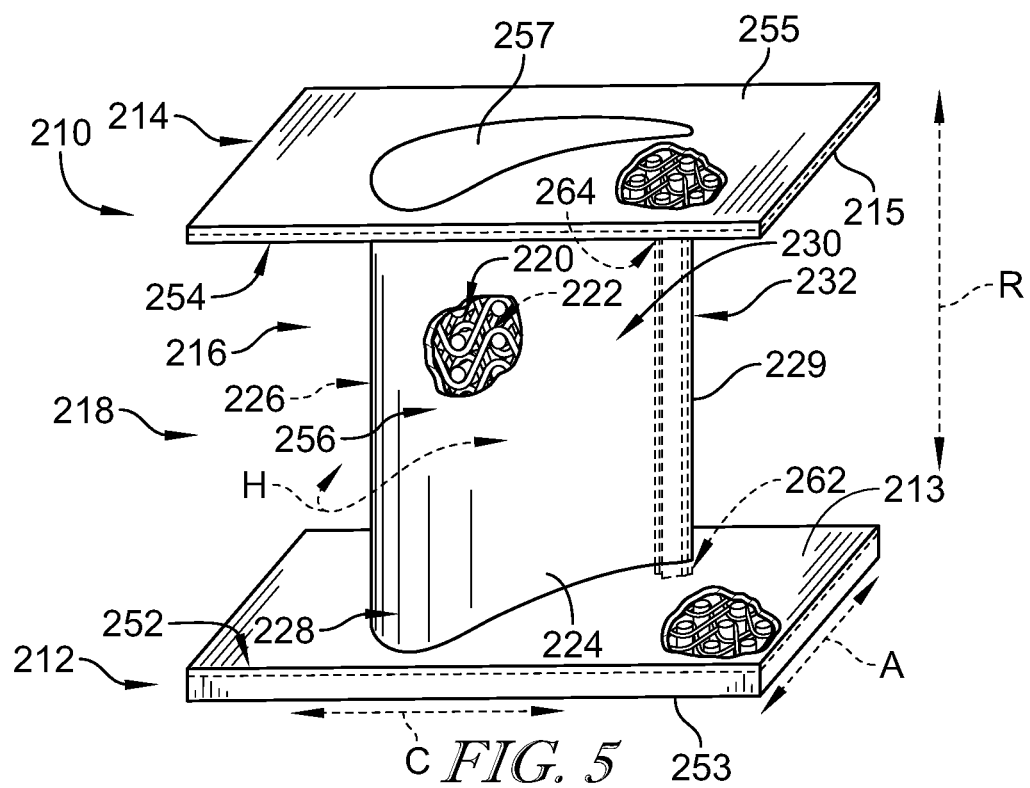
FIG. 5 is a perspective view of a second composite turbine vane including an airfoil, an inner band bonded to the airfoil, and an outer band bonded to the airfoil with portions cut away to show integrated three-dimensionally woven fiber reinforcements that are included in the airfoil, the inner band, and the outer band.
Figure 6:
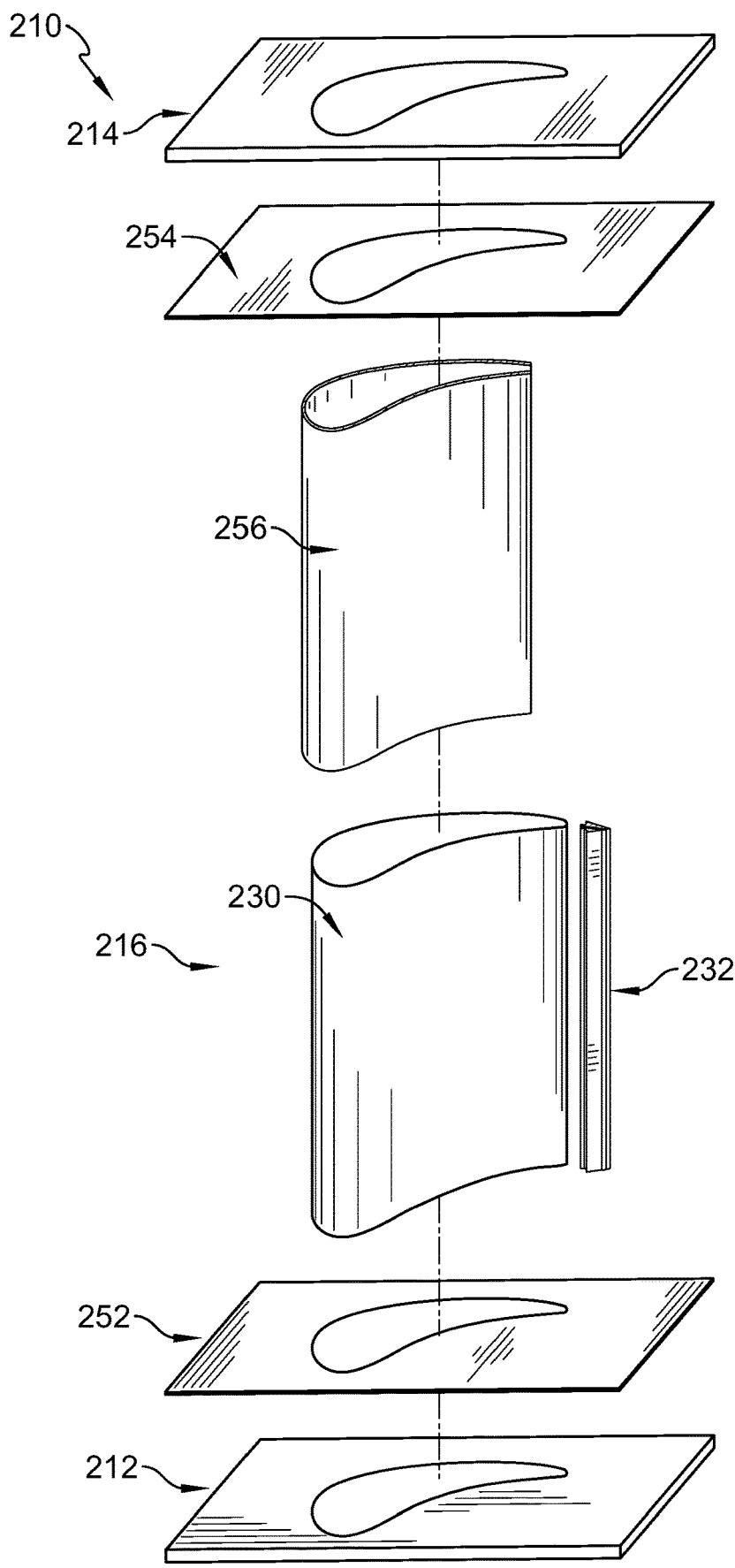
FIG. 6 is an exploded perspective view of the composite turbine vane of FIG. 5 suggesting that the composite turbine vane is co-processed into a one-piece component from the airfoil that includes a primary airfoil portion, a trailing-edge insert, and an airfoil conversion ply; the inner band that includes a primary inner band portion and an inner band conversion ply; and the outer band that includes a primary outer band portion and an outer band conversion ply.

Another turbine vane 210 is shown in FIGS. 5 and 6 of the present disclosure. The turbine vane 210 illustratively is of ceramic matrix composite material construction such that the turbine vane 210 is suitable for use in high temperature areas within the turbine section. More particularly, in the illustrated embodiment, the turbine vane 210 is manufactured from three-dimensional ceramic matrix composite having three-dimensionally woven or braided fiber reinforcements that make up at least a portion of each part of the turbine vane 210. Accordingly, the structure of the turbine vane 210 may be strengthened relative to more simply laid up or otherwise manufactured turbine vanes including ceramic matrix composites.

The turbine vane 210 includes an inner band 212, an outer band 214, and an airfoil 216 as shown in FIGS. 5 and 6. The inner band 212 defines a circumferentially extending inner flow path surface 213 and the outer band 214 defines a circumferentially extending outer flow path surface 215 such that a flow path 218 is located between the inner band 212 and the outer band 214. The airfoil 216 extends from the inner band 212 to the outer band 214 across the flow path between the inner flow path surface 213 and the outer flow path surface 215.

In the illustrative embodiment, components of the turbine vane 210 include three-dimensional reinforcing fibers 220 suspended in matrix material 222 as suggested in FIGS. 5 and 6. The three-dimensional reinforcing fibers 220 (sometimes called a pre-form) are shaped to provide at least a portion of the inner band 212, the outer band 214, and the airfoil 216. In the illustrative embodiment, inner band 212, outer band 214, and airfoil 216 are separately woven or braided and are then coupled via joints. Joints may be provided by matrix material applied via co-processing, braze material, or other suitable attachment.

The three-dimensional reinforcing fibers 220 of the airfoil 216 are biased such that the weave is biased in a hoop direction H as suggested in FIG. 5. In view of the biasing of fibers 220, more fibers extend in the hoop direction H from a pressure side 224 to a suction side 226 of the airfoil 216 around a leading edge 228 of the airfoil 216 than fibers in any one of a radial direction R, axial direction A, or circumferential direction C as suggested in FIG. 5. The three-dimensionally woven fiber reinforcements 220 of the primary airfoil portion 230 may be shaped to provide a pressure side wall, a suction side wall, and a rib like that shown in FIGS. 3 and 4.

The three-dimensional reinforcing fibers 220 are illustratively silicon-carbide (Si—C) fibers but in other embodiments may be other materials suitable for ceramic matrix composite construction. The matrix material 222 is a ceramic-material-containing matrix material; illustratively silicon-carbide (Si—C) matrix material. In other embodiments, other suitable matrix material suitable for ceramic matrix composite material construction may be used.

The airfoil 216 illustratively includes a primary airfoil portion 230 and a trailing-edge insert 232 as shown in FIGS. 5 and 6. The primary airfoil portion 230 is made at least in part from the three-dimensionally woven reinforcement fibers 220. The trailing-edge insert 232 is coupled to the primary airfoil portion 230 and defines a trailing edge 229 of the airfoil 216. The trailing-edge insert 232 of the airfoil 216 may be formed to include cooling air discharge apertures in actively cooled embodiments of turbine vane 210.

The trailing-edge insert 232 extends into recesses 262, 264 formed in the inner band 212 and the outer band 214 to couple the trailing-edge insert 232 to the primary airfoil portion 230 as shown in FIG. 5. In illustrative embodiments, the trailing-edge insert 232 comprises one of monolithic ceramic material and ceramic matrix composite material such that the insert may be coupled to the primary airfoil portion 230 by matrix material. In other embodiments, the trailing-edge insert 232 may be metallic or made from other materials.

In the illustrative embodiment, optional conversion layers 252, 254, 256 are also included in the turbine vane 210 as shown in FIGS. 5 and 6. Conversion layers 252, 254, 256 provide relatively smooth surfaces for interface with gasses moving through flow path 218 in applications where the texture of the three-dimensional composite is rougher than desired. Conversion layers 252, 254, 256 may be provided by one or more of a layer of matrix material or an overwrap of reinforced composite material, such as a tape or a felt cloth. Conversion layers 252, 254, 256 of the present disclosure comprise silicon-carbide (Si—C) material but may be made up of other materials suitable for ceramic matrix composite construction.

An inner band conversion layer 252 provides the inner flow path surface 213 and an outer band conversion layer 254 provides the outer flow path surface 215 as shown in FIG. 5. The inner band conversion layer 252 has a surface finish smoother than an outer surface 253 of the inner band 212. The outer band conversion layer 254 has a surface finish smoother than an inner surface 255 of the outer band 214. An airfoil conversion layer 256 provides an exterior surface of the airfoil 216 having a surface finish smoother than an interior surface 257 of the airfoil 216.

Ceramic matrix composite (CMC) material can typically sustain higher temperatures than traditional metal alloys. Therefore it is often desirable to incorporate CMC material into components in gas turbine engines where higher fuel efficiencies can be reached with higher temperatures. The turbine section of the engine is especially susceptible to high temperatures, so incorporation of ceramic matrix composites can prove to be a benefit. The amount of cooling air that would be required for a ceramic matrix composite is likely to be less than that required for a metal component. Additionally, CMC material is less dense than metal, thus giving the opportunity to save weight on the engine, which again helps fuel efficiency.

The present disclosure is directed to a 3D woven or braided CMC vane, which will be referred to as a 3D preforming. Embodiments of the 3D woven vane could include a solid vane, a hollow vane, a vane with internal ribs, or some combination thereof.

One embodiment for the preformed vane might include an uncooled 3D woven airfoil with integral woven endwalls or bands. The transition from the airfoil body to the endwalls would be part of the woven structure, and would perform the primary function of sealing the flowpath air. Integral endwalls can allow for the vane to be processed as one piece, as described herein. However, other embodiments are envisioned in which only the airfoil is woven, or the airfoil and endwalls are woven separately and then joined in a subsequent step. The airfoil could be woven without the endwalls and metal endwalls could be used. Another combination could be an airfoil that is integrally woven with one of the endwalls, and the other endwall is joined separately, or not even joined at all in the case of a metal endwall.

Embodiments in accordance with the present disclosure may allow the airfoil to be fabricated as a single piece preform that could be placed into tooling for fiber coating, if required, and densification without the need for additional assembly as is the case with standard 2D lay-ups. In 3D preforming, a loom or braider capable of controlling the amount of and position of fiber in three axes is used. Fibers are added or dropped out of the preform via a control program in order to form the basis of the desired shape. With these 3D processes, the amount of fiber can be controlled in each of the three directions, and can be varied locally throughout the preform. This could allow the material properties to be tailored throughout the airfoil. As an example, a high fraction of hoop fibers is desired in the airfoil while a more balanced fiber distribution, or even a high circumferential fraction, may be desired in the endwalls. One way to form the endwalls may be to weave the airfoil portion longer than required and then slice the portion that creates the endwalls. The split flaps may then be folded down before infiltration to create the endwalls that would extend along the axial and circumferential directions.

It can also be envisioned that the 3D preform could be fabricated with a hollow cavity. This could be done as part of the normal preforming process or by using a mandrel that is preformed over. If a mandrel is used, it can be envisioned that it would need to be removed part way through the preforming process or at the end of preforming a whole vane. By including a hollow cavity in the airfoil, cooling air could be introduced into the airfoil to allow operation at even higher temperatures. One advantage that a woven or braided CMC has is that the inside surface of the cavity would be rough and could act as turbulators or features that would increase the transfer of heat from the airfoil to the cooling air by either increasing the convective heat transfer coefficient or simply by increasing overall internal surface area. At this point in time, it is envisioned that the air could exit the vane by film cooling holes that are formed or machined into the surface of the airfoil. Additionally, air may enter through one of the endwalls, and exit through the opposite endwall. It is also envisioned that an impingement tube could be inserted into the airfoil to further increase the heat transfer coefficient on the inner surface of the airfoil but also to appropriately distribute the cooling air within the inner cavity of the airfoil.

Another embodiment conceived includes integrally woven ribs in the airfoil. The rib may be one long rib that acts as a wall to effectively separate the internal cavity of the airfoil into two separate cavities. Or there could be more than one internal wall that separates the internal airfoil cavity into even more cavities for the purposes of controlling internal pressures or potentially cooling more effectively. The ribs could also be discrete ribs (riblets) placed in precise locations in order to help control stress concentrations. Many rib configurations could be envisioned, but in all cases, these should be integrally woven with the 3D preform.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane made from ceramic matrix composite material and adapted for use in a gas turbine engine, the turbine vane comprising
an inner band configured to define a circumferentially extending inner flow path surface;
an outer band configured to define a circumferentially extending outer flow path surface; and
an airfoil that extends from the inner band to the outer band across a flow path defined between the inner flow path surface and the outer flow path surface,
wherein the turbine vane includes three-dimensionally woven reinforcement fibers suspended in matrix material, the three-dimensionally woven reinforcement fibers including a plurality of tows each shaped to provide at least a portion of the inner band, the outer band, and the airfoil, the plurality of tows including a first plurality of fibers arranged generally in a hoop direction from a pressure side to a suction side of the airfoil and a second plurality of fibers woven with the first plurality of fibers and arranged in at least one of a radial direction, an axial direction, and a circumferential direction, the radial direction, the axial direction, and the circumferential direction each being different than the hoop direction, and wherein the airfoil has a higher fraction of the first plurality of fibers that extend in the hoop direction compared to fibers that extend in any one of the radial direction, the axial direction, and the circumferential direction,
wherein the airfoil includes a primary airfoil portion made at least in part from the three-dimensionally woven reinforcement fibers and the three-dimensionally woven fiber reinforcements of the primary airfoil portion are shaped to provide a leading end, a trailing end, a pressure side wall, and a suction side wall spaced apart from the pressure side wall to define a cooling cavity within the primary airfoil portion between the leading end, the trailing end, the pressure side wall, and the suction side wall,
wherein the airfoil includes a trailing-edge insert coupled to the primary airfoil portion to define a trailing edge of the airfoil, and
wherein the trailing edge insert includes an interior portion that extends into the cooling cavity and an exterior portion that defines the trailing-edge of the airfoil.

2. The turbine vane of claim 1, wherein the three-dimensionally woven fiber reinforcements of the primary airfoil portion are shaped to provide a rib that extends from the pressure side wall to the suction side wall through the cooling cavity.

3. The turbine vane of claim 2, wherein the rib is interrupted between the radially inner band and the radially outer band such that spaces are formed between portions of the rib.

4. The turbine vane of claim 1, wherein the trailing-edge insert extends into recesses formed in the inner band and the outer band to couple the trailing-edge insert to the primary airfoil portion.

5. The turbine vane of claim 1, wherein the trailing-edge insert comprises one of monolithic ceramic material and ceramic matrix composite material; and the trailing-edge insert is coupled to the primary airfoil portion by matrix material.

6. The turbine vane of claim 5, wherein the interior portion includes bonding surfaces that engage inner surfaces defining the cooling cavity of the primary airfoil portion.

7. The turbine vane of claim 5, wherein the interior portion includes bonding surfaces that face inner surfaces defining the cooling cavity of the primary airfoil portion and the matrix material is disposed on the bonding surfaces and the inner surfaces to bond the trailing edge insert to the primary airfoil portion.

8. The turbine vane of claim 1, wherein at least one of the inner band and the outer band has a higher fraction of the second plurality of fibers that extend in the circumferential direction compared to fibers that extend in any one of the radial direction and axial direction.

9. The turbine vane of claim 1, wherein the first plurality of fibers that extend in the hoop direction are generally perpendicular to the radial direction.

10. A turbine vane made from ceramic matrix composite material and adapted for use in a gas turbine engine, the turbine vane comprising
an inner band configured to define a circumferentially extending inner flow path surface;
an outer band configured to define a circumferentially extending outer flow path surface; and
an airfoil that extends from the inner band to the outer band across a flow path defined between the inner flow path surface and the outer flow path surface,
wherein the turbine vane includes three-dimensionally woven reinforcement fibers suspended in matrix material, the three-dimensionally woven reinforcement fibers including a plurality of tows each shaped to provide at least a portion of the inner band, the outer band, and the airfoil, the plurality of tows including a first plurality of fibers arranged generally in a hoop direction from a pressure side to a suction side of the airfoil and a second plurality of fibers woven with the first plurality of fibers and arranged in at least one of a radial direction, an axial direction, and a circumferential direction, the radial direction, the axial direction, and the circumferential direction each being different than the hoop direction, and wherein the airfoil has a higher fraction of the first plurality of fibers that extend in the hoop direction compared to fibers that extend in any one of the radial direction, the axial direction, and the circumferential direction,
wherein the airfoil includes a primary airfoil portion made at least in part from the three-dimensionally woven reinforcement fibers and the three-dimensionally woven fiber reinforcements of the primary airfoil portion are shaped to provide a pressure side wall and a suction side wall spaced apart from the pressure side wall to define a cooling cavity therebetween,
wherein the airfoil includes a trailing-edge insert coupled to the primary airfoil portion to define a trailing edge of the airfoil, and
wherein the trailing-edge insert is formed to include cooling air discharge apertures that open into the cooling cavity to carry cooling air from inside the airfoil axially-aft out to the gas path.

11. A turbine vane made from ceramic matrix composite material and adapted for use in a gas turbine engine, the turbine vane comprising
an inner band configured to define a circumferentially extending inner flow path surface, the inner band including three-dimensionally woven reinforcement fibers;
an outer band configured to define a circumferentially extending outer flow path surface, the outer band including three-dimensionally woven reinforcement fibers; and an airfoil that extends from the inner band to the outer band across a flow path defined between the inner flow path surface and the outer flow path surface, the airfoil including three-dimensionally woven reinforcement fibers, wherein the three-dimensionally woven reinforcement fibers included in the airfoil include a plurality of tows each shaped to provide at least a portion of the inner band and the outer band, the plurality of tows including a first plurality of fibers arranged generally in a hoop direction from a pressure side to a suction side of the airfoil and a second plurality of fibers woven with the first plurality of fibers and arranged in at least one of a radial direction, an axial direction, and a circumferential direction, the radial direction, the axial direction, and the circumferential direction each being different than the hoop direction, and wherein the airfoil has a higher fraction of the first plurality of fibers that extend in the hoop direction compared to fibers that extend in any one of the radial direction, the axial direction, and the circumferential direction.

12. The turbine vane of claim 11, wherein the airfoil includes a trailing-edge insert coupled to a primary airfoil portion that includes the three-dimensionally woven reinforcement such that the trailing-edge insert defines a trailing edge of the airfoil.

13. The turbine vane of claim 12, wherein the trailing-edge insert is formed to include cooling air discharge apertures in fluid communication with a cooling cavity formed by the primary airfoil portion to carry cooling air from inside the airfoil out to the gas path.

14. The turbine vane of claim 12, wherein the trailing-edge insert extends into recesses formed in the inner band and the outer band to couple the trailing-edge insert to the primary airfoil portion.

15. The turbine vane of claim 12, wherein the trailing-edge insert comprises one of monolithic ceramic material and ceramic matrix composite material; and the trailing-edge insert is coupled to the primary airfoil portion by matrix material.

16. The turbine vane of claim 11, wherein the airfoil includes a primary airfoil portion made at least in part from the three-dimensionally woven reinforcement fibers and the three-dimensionally woven fiber reinforcements of the primary airfoil portion are shaped to provide a leading end, a trailing end, a pressure side wall, and a suction side wall spaced apart from the pressure side wall to define a cooling cavity between the leading end, the trailing end, the pressure side wall, and the suction side wall, wherein the airfoil includes a trailing-edge insert coupled to the primary airfoil portion to define a trailing edge of the airfoil, and wherein the trailing edge insert includes an interior portion that extends into the cooling cavity and an exterior portion that defines the trailing-edge of the airfoil.

17. The turbine vane of claim 16, wherein the interior portion includes bonding surfaces that engage inner surfaces defining the cooling cavity of the primary airfoil portion.

18. The turbine vane of claim 16, wherein the interior portion includes bonding surfaces that face inner surfaces defining the cooling cavity of the primary airfoil portion and matrix material is disposed on the bonding surfaces and the inner surfaces to bond the trailing edge insert to the primary airfoil portion.

19. The turbine vane of claim 11, wherein at least one of the inner band and the outer band has a higher fraction of the second plurality of fibers that extend in the circumferential direction compared to fibers that extend in any one of the radial direction and axial direction.

20. The turbine vane of claim 11, wherein the first plurality of fibers that extend in the hoop direction are generally perpendicular to the radial direction.

* * * * *